INVENTOR.
Norman A. Leibreich.
BY
DES JARDINS, ROBINSON, TRITLE & SCHENK
HIS ATTORNEYS.

Jan. 3, 1961 N. A. LEIBREICH 2,966,833
HEADING MACHINE FOR FORMING CONTAINERS
Filed Feb. 10, 1958 8 Sheets-Sheet 2

INVENTOR.
NORMAN A. LEIBREICH.
BY
DES JARDINS, ROBINSON, TRITLE & SCHENK.
Albert F. Robinson
HIS ATTORNEYS.

Jan. 3, 1961 N. A. LEIBREICH 2,966,833
HEADING MACHINE FOR FORMING CONTAINERS
Filed Feb. 10, 1958 8 Sheets-Sheet 4

INVENTOR.
NORMAN A. LEIBREICH.
BY DES JARDINS, ROBINSON,
TRITLE & SCHENK.
Albert R. Robinson
HIS ATTORNEYS.

Jan. 3, 1961  N. A. LEIBREICH  2,966,833
HEADING MACHINE FOR FORMING CONTAINERS
Filed Feb. 10, 1958  8 Sheets-Sheet 6

INVENTOR.
NORMAN A. LEIBREICH.
BY
DES JARDINS, ROBINSON, TRITLE & SCHENK.
HIS ATTORNEYS.

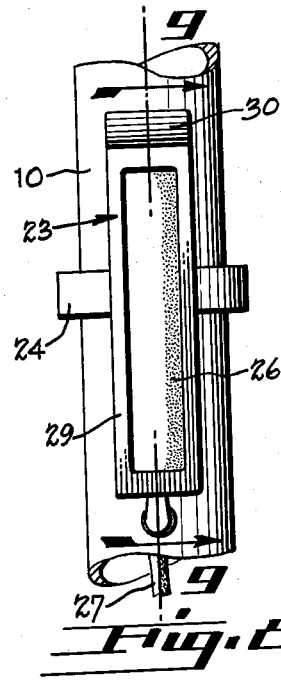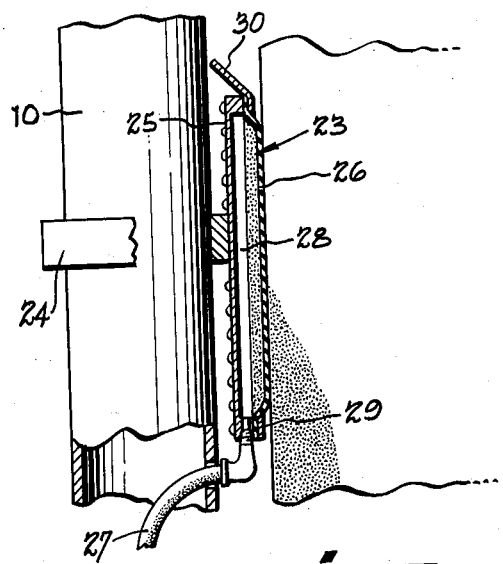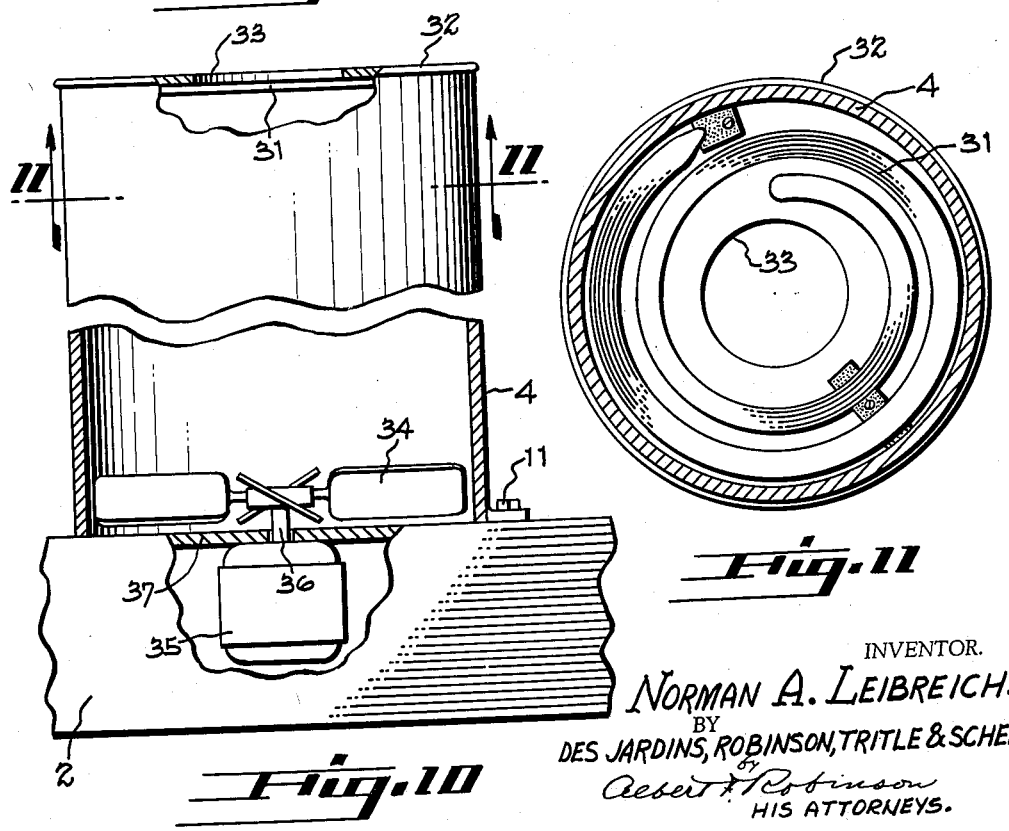

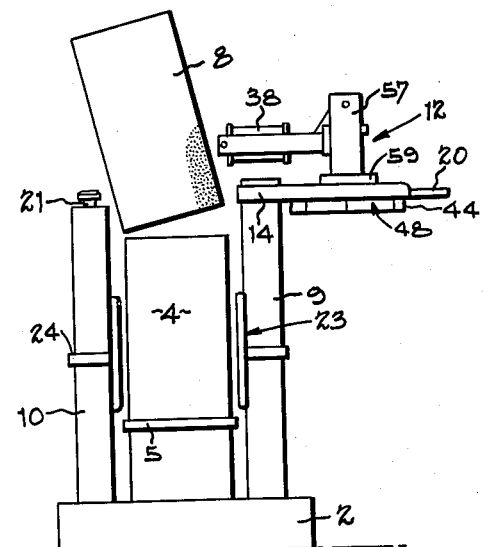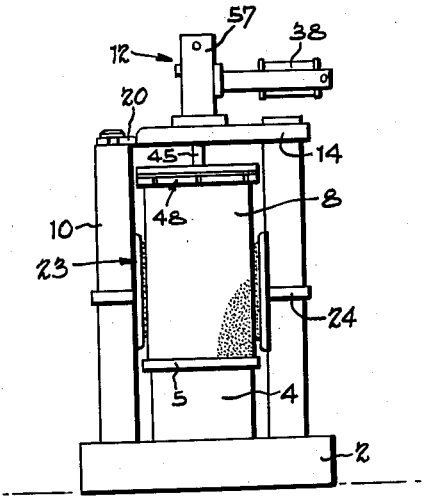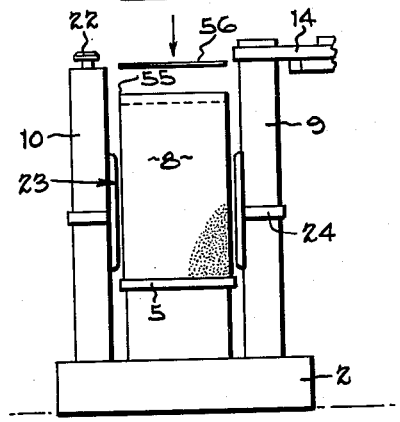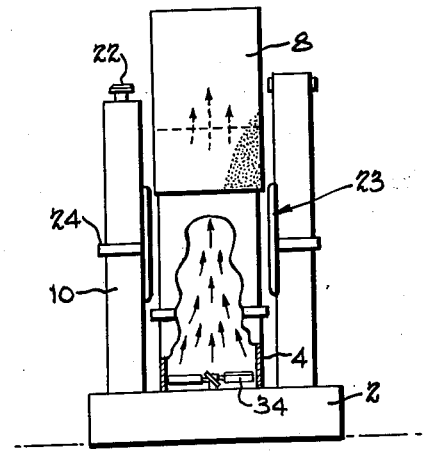

United States Patent Office 2,966,833
Patented Jan. 3, 1961

2,966,833

HEADING MACHINE FOR FORMING CONTAINERS

Norman A. Leibreich, Cincinnati, Ohio, assignor, by mesne assignments, to The Mead Corporation, a corporation of Ohio Filed Feb. 10, 1958, Ser. No. 714,263

10 Claims. (Cl. 93—55.1)

This invention relates to a heading machine for closing the end of tube lengths for forming containers, and it pertains particularly to a machine for fitting a closure disc within one end of a tubular length, spaced from the bottom edge, to provide a projecting end wall portion which is overturned inwardly for forming a surrounding peripherial marginal lap over the closure disc and secured thereto by any suitable means.

The invention particularly pertains to a heading machine for fitting the bottom closure of paper board drum containers which are commonly used for packaging plastic materials, such as rubber, asphalt and like compositions that are poured into the containers in a hot molten condition to be solidified therein upon being cooled. The interior of the drum is lined with suitable material to make it resistant to impregnation and absorption of the contents within said container.

Heretofore, the inturned marginal end wall of the tubular drum has been formed with a series of tabs set off by intervening notches, preferably V-shaped, so that when the resulting V-shaped tabs are bent inwardly, their adjacent side edges will not lap but will either be spaced apart or in abutting relation. It is preferable to have the V-notches of such size that the adjacent side edges of the tabs will be in abutting relation, thereby forming over the marginal edge of the disc closure a lap which is continuous and of uniform thickness. However, these drum containers are made with many different forms of tabs, and the aim of the present invention is to have a machine such that is adapted for fitting the end closure within the end of the tubular length and heading the end of said length irrespective of the form of the end tabs on the tubular length or whether or not any end tabs whatever be provided thereon. The machine is adapted to fit the end closure within the tubular length and lap the projecting end wall of said tubular length over the end closure whether the inturned end wall be provided with or without a tab formation. The fold is made and subjected to sufficient pressure to press it down to a uniform thickness. The machine is also adapted for heading tubular lengths of any length and of any type end formation. An adhesive is preferably used for securing the lap end to the end closure, and pressure is maintained until the adhesive is dried or set.

Accordingly, one of the main objects of the invention is a drum container heading machine which is simple in construction and efficient in operation.

Another object of the invention is a drum container header which is adapted for different drum container constructions.

Another object of the invention is a drum container header which is entirely automatic in operation except for inserting the tubular length in the machine and inserting the end closure therein.

Another object of the invention is a machine for applying extreme pressure to the closure head.

Further objects, and objects relating to details of construction and economies of operation, will readily appear from the detailed description to follow. In one instance, the objects of the invention have been accomplished by the device and means set forth in the following specification. The invention is clearly defined and pointed out in the appended claims, and a structure constituting one preferred embodiment thereof is illustrated in the accompanying drawings, forming a part of this specification, in which:

Fig. 8 is a side elevation of one of the side grips on one of the side posts of Fig. 1.

Fig. 9 is a vertical cross-section on line 9—9 of Fig. 8, looking in the direction of the arrows.

Fig. 10 is an enlarged view of the drum support.

Fig. 11 is a cross-section on line 11—11 of Fig. 10, looking upwardly in the direction of the arrows.

Figs. 12 to 14 are similar side views of the machine, showing steps in the sequence of placing a tubular length on the form support, inserting a closure disc, and applying adhesive to the margin of said discs.

Fig. 15 is a view of the machine with a drum length positioned thereon and being headed.

Fig. 16 shows the headed drum container being ejected from the form following completion of the heading operation.

Figure 1:
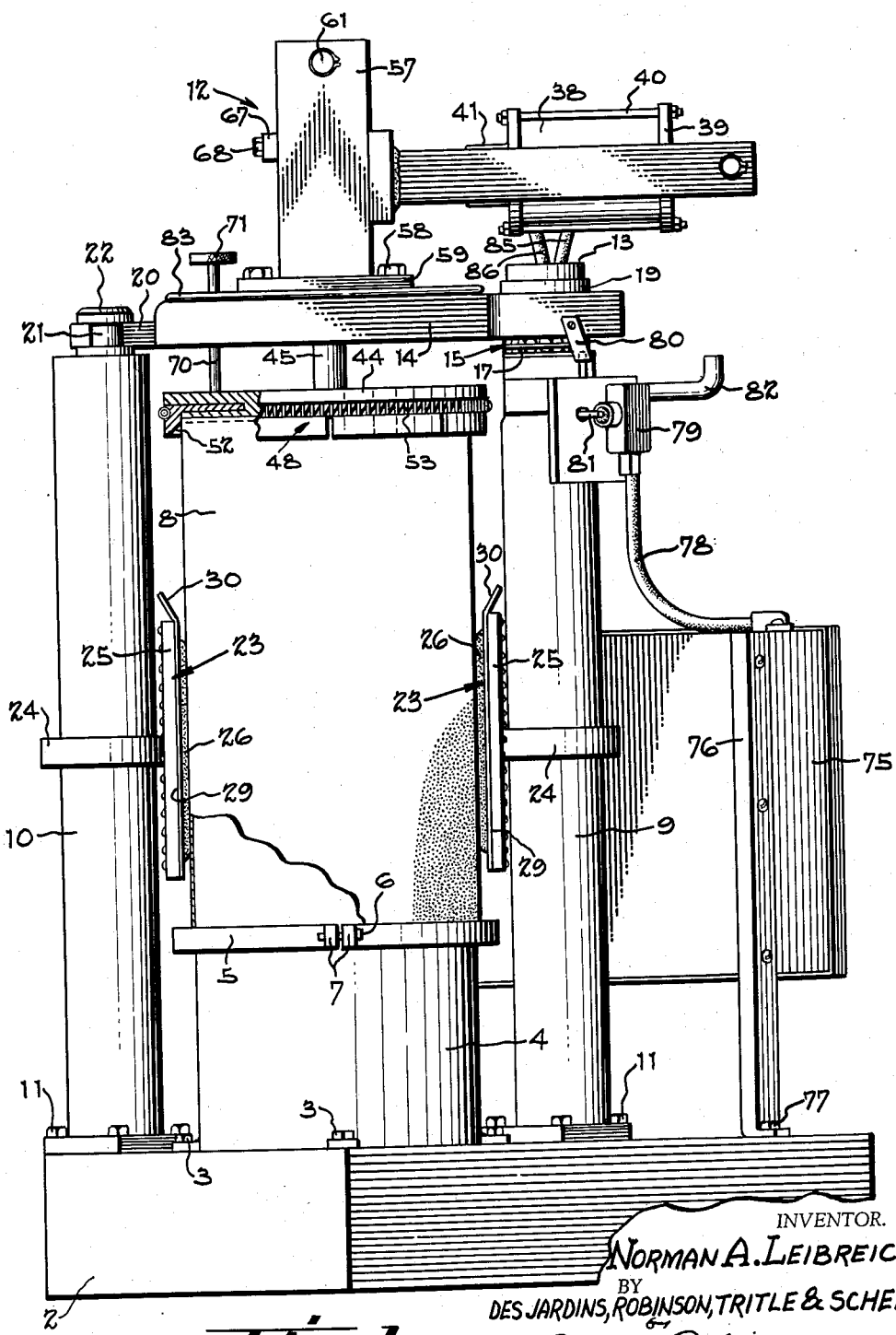
Fig. 1 is a side elevation of one embodiment of a machine embodying the invention.

Referring specifically to the drawings in which like numerals designate like parts, numeral 2 is a base to which is bolted at 3 the bottom and end of a cylindrical form 4 of a height somewhat in excess of the length of any tubular length which is to be headed at one end in the machine. Near the base of the form 4 is a band or ring 5 which is vertically adjusted to any desired elevation and clamped in position by bolt 6 extending through the terminal ears 7. This ring or band 5 serves as an abutment shoulder against which the bottom edge of a tubular length 8 rests when placed on the form 4 for its top end to be closed or headed.

On the opposite sides of the form 4 are a pair of posts 9 and 10, one on each side, which are also bolted to the base 2 by bolts 11. These posts are somewhat higher than the form 4 for pivotally mounting on one post a presser head which is swiveled to and from latching position with the other post. This presser head is designated generally by numeral 12 pivoted to the top end 13 of post 9 by means of ears 14, extending from said head and having a perforation therethrough in which the top end 13 of the post projects for having the ears 14 of said head 12 swiveled thereto. The ears 14 are disposed between a pair of conventional anti-friction bearing rings 15 composed of balls 16 spaced apart in cages 17. The bottom bearing ring seats on a shoulder 18 resulting from the top end 13 of the post being of reduced diameter. A washer plate 19 is preferably disposed above and below each of the bearing rings 15. The opposite side of the presser head 12 is provided with a hook ear 20 which is adapted to engage with the reduced stub 21 at the top end of the other post 10, said stub having an enlarged head 22 so that the hook ear 20 of the presser head 12 will be held against lifting when pressure is applied to the drum container as hereinafter described. The reduced stub 21 in effect has an annular channel or recess therein for receiving the hook ear 20.

A grip shoe 23 (Figs. 1, 8 and 9) is strapped to each of the posts 9 and 10 by a band 24, each of said shoes being of identical construction and comprising a back support 25 to which is movable fitted a flexible gripping face 26 of some such expansible material as rubber or the like. Compressed air is fed through conduit 27 into a chamber or pocket 28 between the back support 25 and the gripping face 26 for expanding said gripping face against the walls of the tubular length 8 when placed on the form 4. The gripping face 26 is clamped to the back support 25 by a clamp ring 29 having an outwardly flared top ear 30. These grip shoes 23 may be of any construction that is adapted to be moved to and released from gripping position against the opposite sides of the tubular length 8.

An electrical heating element 31 (Figs. 10 and 11) is mounted in the top of cylindrical form 4, beneath a top plate 32, both the said heating element and the top plate being provided with a central hole 33 of substantial diameter. A fan 34 is mounted within the form 4, preferably near the bottom end, to be driven by a motor 35 which is connected to a shaft 36 projecting through the bottom end 37 of the form. The fan 34 is connected to a switch which will turn on the fan when the forming head 12 has been swung open so that the headed drum can be blown from the form 4 as shown in Fig. 16.

Figure 7:
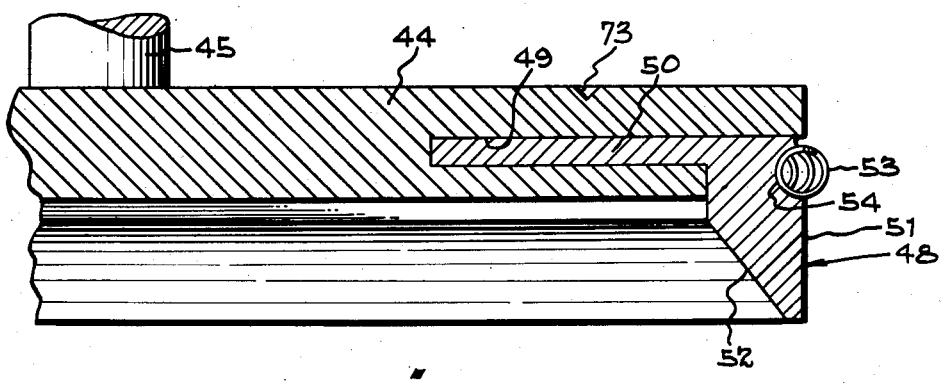
Fig. 7 is a cross-section on line 7—7 of Fig. 6.

The presser head 12 has a cylinder 38 clamped between end closure ends 39 by tie bolts 40. This cylinder unit has a piston contained therein from which projects through hub 41 a piston rod 42 for being connected to a lever mechanism, designated generally by numeral 43, for operating a presser member 44 which is vertically movable on the presser head 12 by means of an arm 45 extending through a recess 46 in web 47. This presser member 44 is cup-shaped and comprises a plurality of segments 48 radially slidable within an annular groove 49 formed in said member 44. These segments 48 have a shank portion 50 from which projects a downwardly extending arcuate rim portion 51 having a chamfered inside edge 52. A coiled wire spring 53 is disposed circumferentially about the outside wall of the rim portion 51, seated within a groove 54. This spring 53 is under tension to bias the segments 48 in retracted or non-expanded position as shown in Fig. 7. The chamfered inside edges 52 of the segments 48 contact the outside edge of the end 55 of the tubular length 8 on the form 4 and forces said end 55 of the tubular length inwardly and downwardly over a disc 56 which has first been inserted within the end of the tubular length 8 as shown in Fig. 12. The angle of the chamfer is disposed at the most effective desired angle for first bending the end 55 of the tubular length inwardly and then downwardly after the inturning thereof has been completed so as to prevent wrinkling.

The presser head 44 has a vertical post or pedestal 57 mounted on its top side and bolted thereto by bolts 58 extending through the pedestal base 59. The arm 45 on the presser head is connected to the piston rod 42 by lever mechanism 43 for actuating said presser head. The lever mechanism for operating the presser member 44 comprises double links 60 pivoted at one end to the post 57 by a wrist pin 61 and at the opposite end to another wrist pin 62 connected to the heel of a pair of angular links 63. One end of the angular links 63 are pivoted to the end of the piston by the wrist pin 64, and the opposite end is connected to the arm 45 projecting upwardly through the presser head from the presser member 44 by means of wrist pin 66. A brace 67 is advantageously bolted at 68 to the pedestal having a recess 69 formed therein in which the arm 45 slides. The forming member is vertically actuated by the piston-cylinder unit by means of the leverage connection which provides for a high degree of pressure being exerted by the forming member. There is an adjusting means 70, with a knob 71 on one end, screw fitted at its opposite end to the presser head 44 for adjusting it vertically. The presser head 44 has a series of tapped screw holes 72, connected by a circular groove 73, into any selected one of which the end of means 70 may be attached. The presser head is rotated for one of the screw holes 72 to be engaged by the end of adjusting means 70.

An electrical switch box 75 is mounted on posts 76 bolted at 77 to the base 2 and has an electric cable 78 leading to a switch 79. This switch 79 is turned on automatically by a trip arm 80 on the swinging presser head 12 when it swings into latched position. There is also a trip arm (Fig. 2) 81 disposed to contact switch 79 for snapping it off when the presser head is swung to open or unlatched position. There is also a stop 82 on the presser head for limiting its open position, said stop 82 being in the form of a projecting arm. To facilitate operation of the presser head being swung to and from latched position, it may advantageously be provided with a hand band 83 welded in place to the top of the presser head at 84.

The piston cylinder unit is connected to lines 85 and 86 and in the line 85 there is pressure gauge 87 for showing the amount of hydraulic pressure exerted on the presser head.

There is a master electrical switch 89 by which the electrical power may be turned off and on, and there may be a top brace 90 for the top end of the switch box 45, one end of said brace 90 to be attached thereto by screws 91.

A pair of hydraulic pumps 92 may be mounted on the unit, they being connected to the fluid line 93 leading to the cylinder 38.

Figure 2:
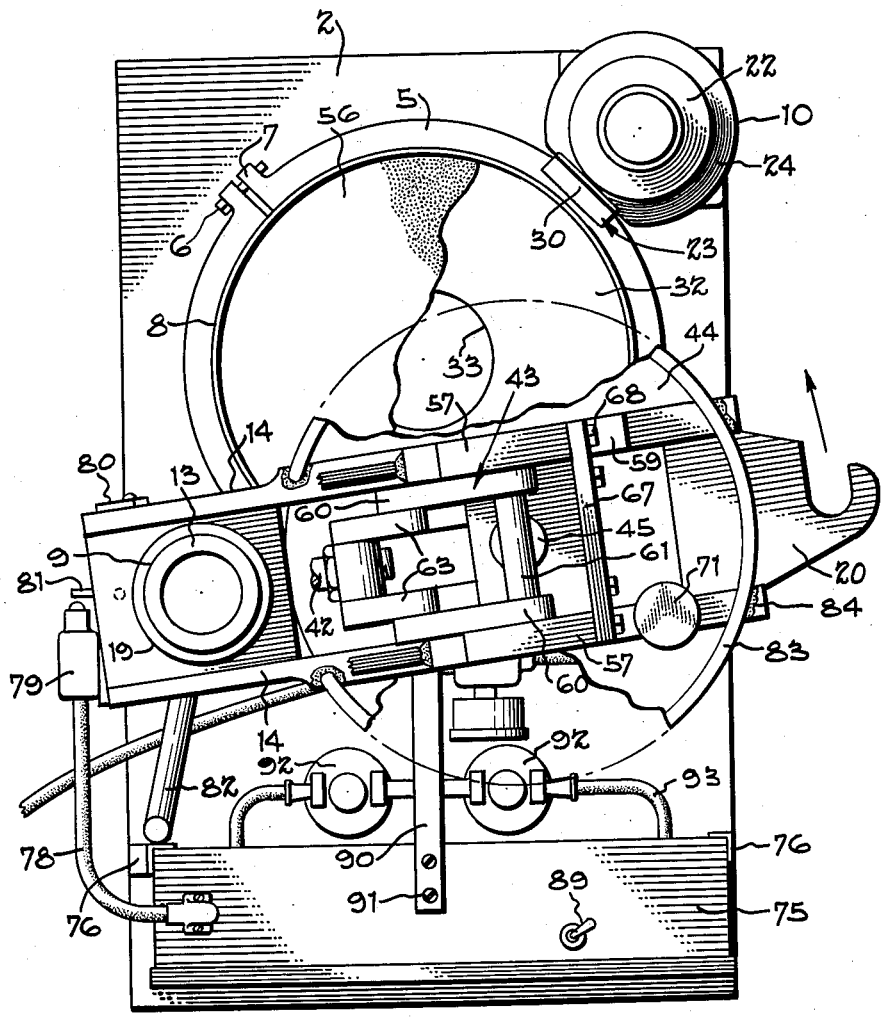
Fig. 2 is a top plan view of the machine with the piovted head in open position.
Figure 3:
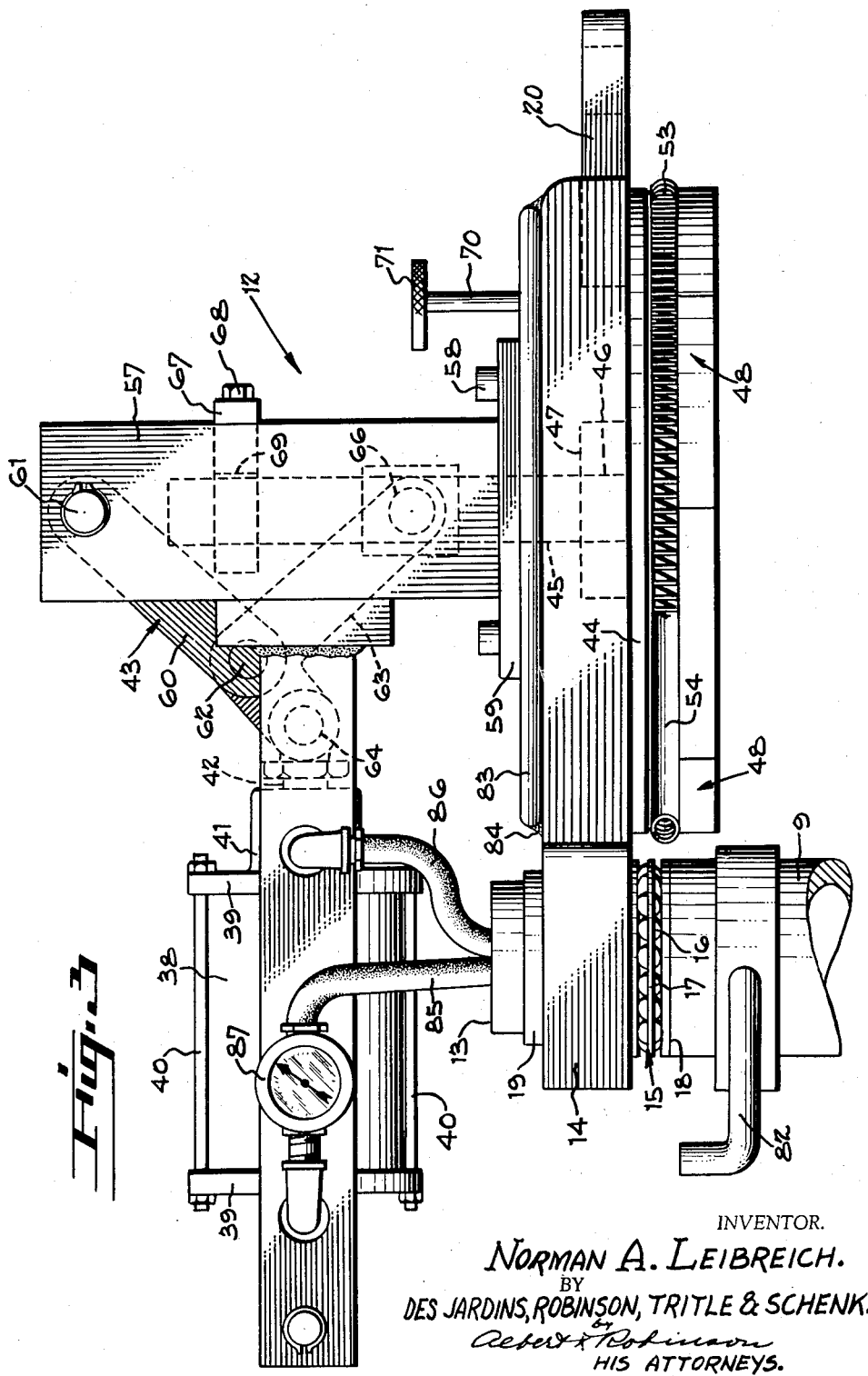
Fig. 3 is an enlarged view of the pivoted head of the machine in open position and its pivotal connection to the machine, the forming head thereof being retracted.
Figure 4:
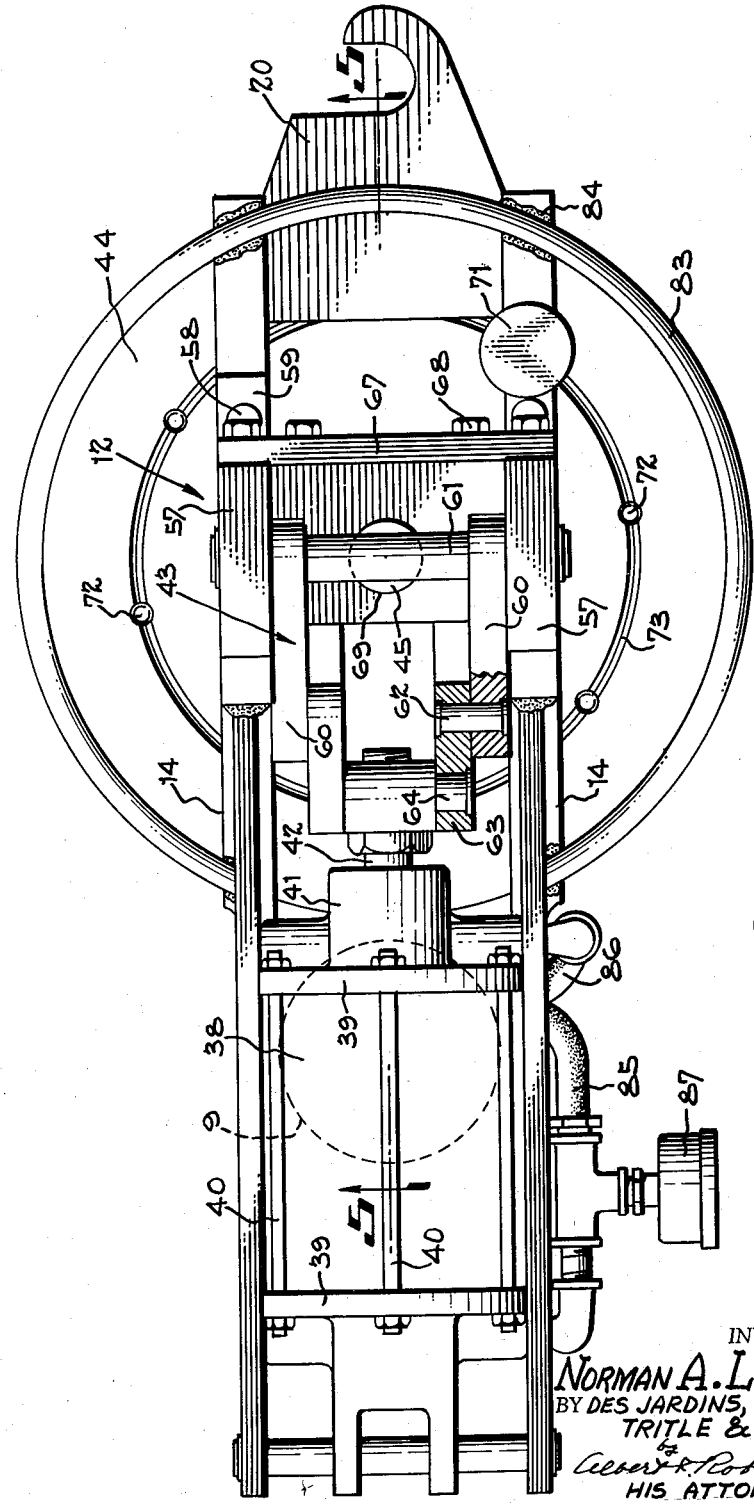
Fig. 4 is an enlarged top plan view of the pivoted head.
Figure 5:
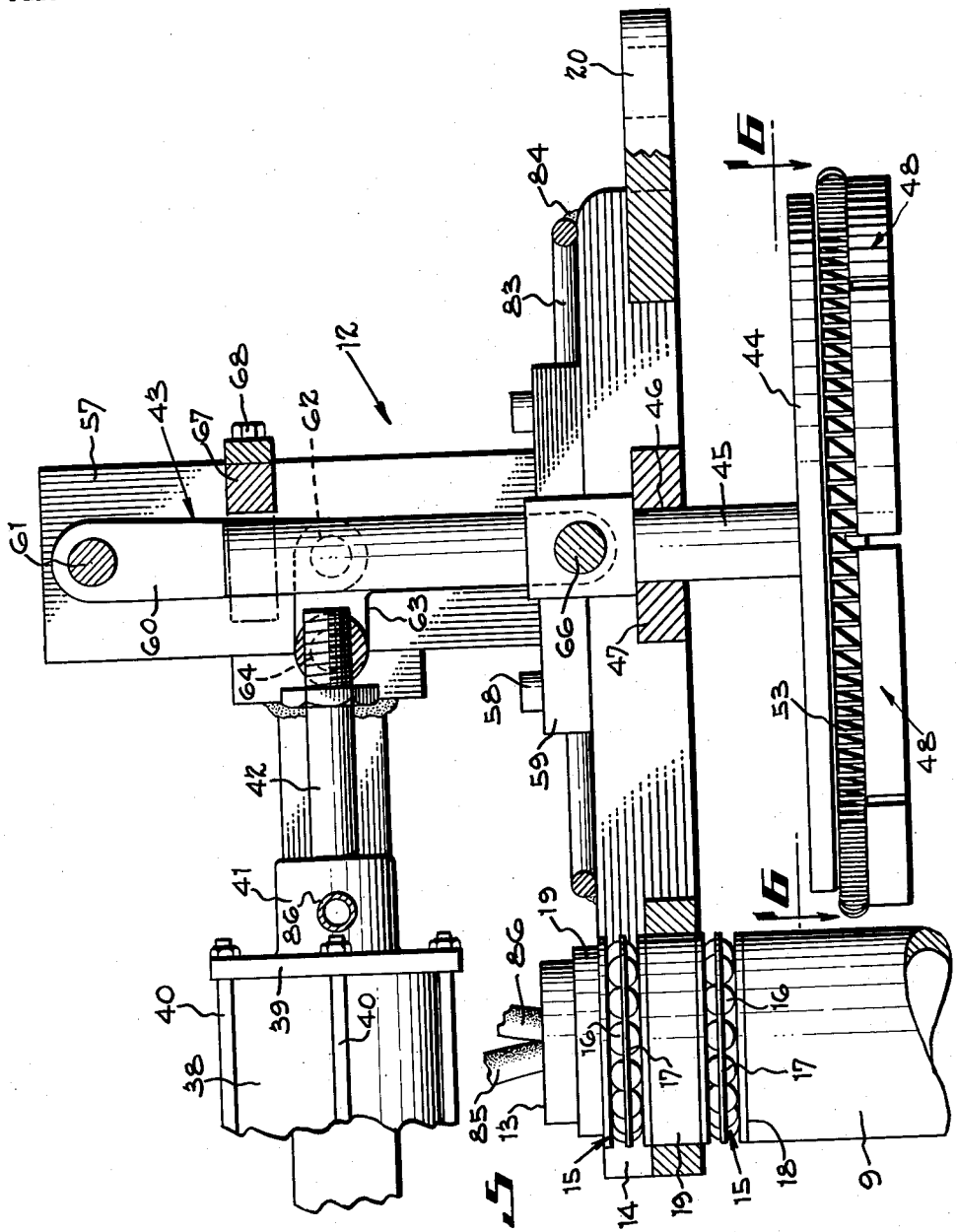
Fig. 5 is an enlarged view of the pivoted head, similar to Fig. 3, with the forming head moved downwardly.
Figure 6:
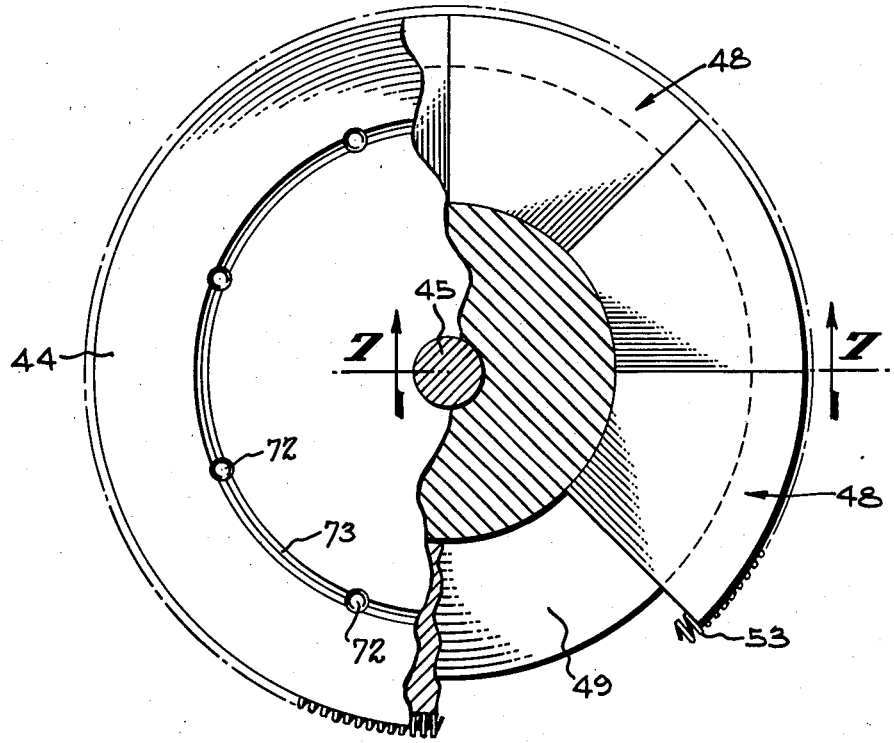
Fig. 6 is a view on line 6—6 of Fig. 5, looking downwardly in the direction of the arrows.

In operation of the device the presser head is swung to latched position shown in Fig. 1 from unlatched position shown in Fig. 2. In the unlatched position the device is automatically switched off and will be automatically switched on in latched position. The heater if used is also automatically switched on and off. This heater is optional. It is used if heat reacted adhesive is used for sealing the lap end of the container or drum, or if the adhesive needs to be dried for setting it. However, an adhesive may be used which will set within a certain time upon exposure of the air, and, if such adhesive be used, it does not need to be heated, and the heater does not need to be used. However, the device is preferably equipped with a heater so that any type adhesion can be used.

The steps for forming a container or drums are graphically shown in Figs. 12 to 16, inclusive. The header is open to unlatched position as shown in Fig. 12 for a tubular length 8 to be placed over the form 4. A disc bottom 56 is inserted in the top end 55 of said length 8 which extends somewhat above the top of the form. By reason of the tubular length it is adjusted to position on the form by its bottom end seating on the band 5, and the disc head will be automatically positioned within said length. Adhesive is brushed on the margin of the disc by brush 88 or the inside surface of the projecting end of said length, as shown in Fig. 14, unless the adhesive has been previously applied, as it might be. The presser head is then swung into latched position as shown in Fig. 15 for the projecting end of the tubular lengths to be inturned over the marginal edge of the disc and adhered. Following this operation, the presser head is swung open to unlatched position, and the fan is operated to eject the headed drum in container from the form as shown in Fig. 16 to be removed by the operator who will then insert another tubular length to have the operation repeated.

It is understood that there may be various changes in details of construction without departing from the spirit of the invention, and, therefore, I claim my invention broadly as indicated by the appended claims.

Having thus described my invention, what I claim as new and useful and desire to secure by United States Letters Patent, is:

1. A machine for heading tubular drums comprising a form on which a tubular length is placed for being supported, a vertically movable presser member for bending inwardly the projecting end of the tubular length, said presser member comprising a series of radially movable segments each having an upwardly and inwardly extending inner wall surface for bending inwardly the projecting end of the tubular length over an inserted end closure, said presser member having a flat surface for bending said inwardly bent projecting end of said tubular length flat against said end closure, a carrier for the presser member pivotally mounted for being swiveled in and out of position above said form, means for biasing said segments to retracted position but yieldably permitting them to be expanded outwardly, and means for ejecting the headed drum from the form.

2. The heading machine of claim 1 in which the form is hollow and is provided with a perforated top end and the means for ejecting the drum is a blower mounted within said form.

3. The heading machine of claim 1 in which means are provided for clamping the wall of the tubular length against the form.

4. The heading machine of claim 1 in which a heating means is provided for the top of the form.

5. The heading machine of claim 1 in which each of the segments is provided with an outer wall and the biasing means for said segments is an elastic band circumferentially disposed about the outer walls of said segments.

6. The heading machine of claim 1 including a hydraulic means for actuating the presser member against the top of the form.

7. The heading machine of claim 1 including a leverage mechanism interposed between the pressed member and the hydraulic means and said leverage mechanism actuated by said hydraulic means.

8. The heading machine of claim 1 which is provided with means for hooking the carrier for the presser member when swung into operative position over the form.

9. The heading machine of claim 1 provided with trip means for starting operation of the presser member when the carrier therefore is moved into operative position and with a trip means for stopping operation of said presser member when the carrier therefor is moved into inoperative position.

10. A machine for heading tubular drums comprising a form on which a tubular length is placed for being supported, a vertically movable presser member for bending inwardly the projecting end of the tubular length, said presser member comprising a series of radially movable segments each having an upwardly and inwardly extending inner wall surface for bending inwardly the projecting end of the tubular length over an inserted end closure, a carrier for the presser member pivoted to a support for being swung in and out of position over the form, means for detachably latching the carrier in position, and clamping members mounted on the carrier support on opposite sides of said form, said clamping members comprising flexible diaphragms.

References Cited in the file of this patent
UNITED STATES PATENTS

| | | |
|---|---|---|
| 1,401,132 | Bond | Dec. 27, 1921 |
| 1,555,977 | Hulbert | Oct. 6, 1925 |
| 2,058,892 | Koch | Oct. 27, 1936 |
| 2,106,739 | Harrison | Feb. 1, 1938 |
| 2,371,265 | Ray | Mar. 13, 1945 |
| 2,671,490 | Jansen | Mar. 9, 1954 |
| 2,700,328 | Claus | Jan. 25, 1955 |
| 2,703,952 | Perriguey | Mar. 15, 1955 |
| 2,778,865 | Kongsgaarden | Jan. 22, 1957 |